United States Patent [19]

Tanaka

[11] Patent Number: 4,532,523

[45] Date of Patent: Jul. 30, 1985

[54] TONE CONTROL FOR THERMAL INK-TRANSFER PRINTING APPARATUS

[75] Inventor: Hideshi Tanaka, Yokohama, Japan

[73] Assignee: Victor Company of Japan, Ltd., Yokohama, Japan

[21] Appl. No.: 474,197

[22] Filed: Mar. 10, 1983

[30] Foreign Application Priority Data

Mar. 16, 1982 [JP] Japan .................. 57-41191
Mar. 30, 1982 [JP] Japan .................. 57-50120

[51] Int. Cl.³ .......................... G01D 15/16
[52] U.S. Cl. .................. 346/76 PH; 358/298; 219/216
[58] Field of Search .............. 346/76 R, 76 PH, 202, 346/204, 207, 208; 358/283, 298, 296; 219/216 R, 216 PH; 400/120; 250/317.1, 318, 319; 355/4

[56] References Cited

U.S. PATENT DOCUMENTS

| | | | |
|---|---|---|---|
| 4,284,876 | 8/1981 | Ishibashi et al. | 346/76 PH |
| 4,368,491 | 1/1983 | Saito | 358/283 |
| 4,374,385 | 2/1983 | Yoshizaki et al. | 346/76 PH |

FOREIGN PATENT DOCUMENTS

| | | |
|---|---|---|
| 2017296 | 12/1970 | Fed. Rep. of Germany . |
| 2363213 | 6/1974 | Fed. Rep. of Germany . |
| 2616947 | 10/1976 | Fed. Rep. of Germany . |
| 2918710 | 1/1980 | Fed. Rep. of Germany . |
| 3041356 | 5/1981 | Fed. Rep. of Germany . |
| 2070384 | 2/1981 | United Kingdom . |
| 2110036 | 6/1982 | United Kingdom . |
| 2110045 | 11/1982 | United Kingdom . |
| 2114850 | 6/1983 | United Kingdom . |

OTHER PUBLICATIONS

IBM Technical Disclosure Bulletin, vol. 24, No. 1B, Jun. 1981, New York, NY, E. A. Cunningham, "Thermal Printhead Drive Circuit for High Speed Printing", pp. 646–648.

Primary Examiner—E. A. Goldberg
Assistant Examiner—A. Evans
Attorney, Agent, or Firm—Lester Horwitz

[57] ABSTRACT

A tone control device in a thermal ink-transfer type printing apparatus comprising a thermal printing head having a plurality of head elements, where each of the plurality of head elements respectively comprise heating resistors for heating a transfer sheet adhered with a kind of ink which melts due to heat and transferring melted ink onto a recording sheet which makes contact with the transfer sheet to print images such as characters and figures, comprises a converting circuit for sampling an input analog signal indicating tone of density of an image to be printed on the recording sheet according to the number of the head elements, and converting the input analog signal into a digital signal, a memory for storing and reading out the output converted digital signal of the converting circuit, and a control circuit for controlling a duration with which a current having a predetermined value is applied to the head elements, with respect to each of the head elements, according to data of the digital signal read out from the memory.

7 Claims, 10 Drawing Figures

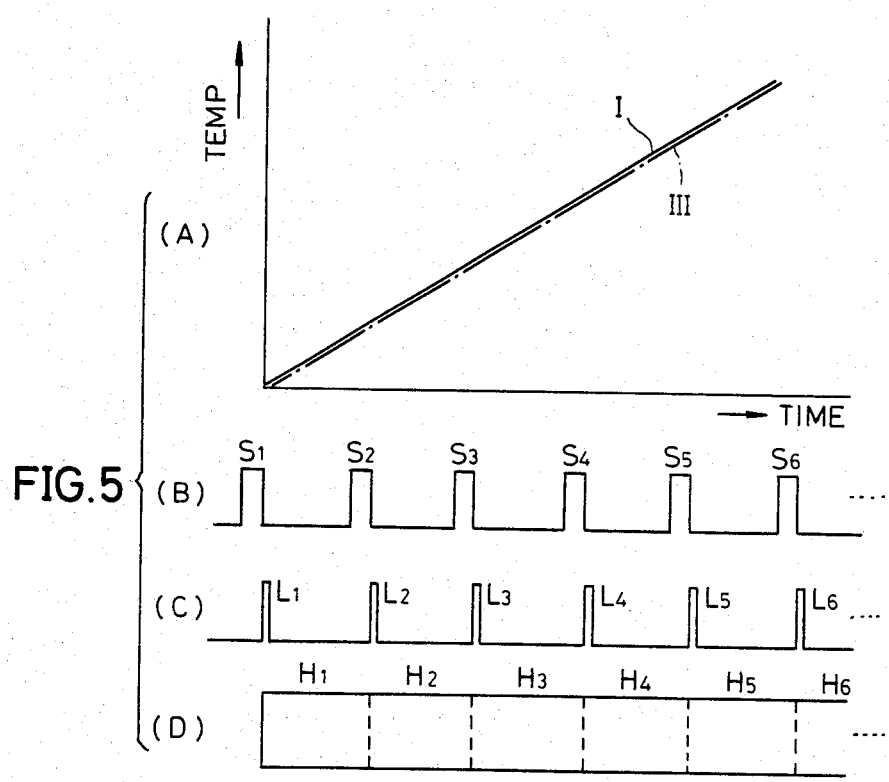

TONE CONTROL FOR THERMAL INK-TRANSFER PRINTING APPARATUS

BACKGROUND OF THE INVENTION

The present invention generally relates to tone control devices for thermal ink-transfer type printing apparatuses (hereinafter referred to as thermal printing apparatuses), and more particularly to a tone control device in a thermal printing apparatus, for controlling the density or tone of printing by controlling the size of printing dots according to the number of times a pulse current is applied to a thermal printing head.

Among terminal printers or hard-copy apparatuses such as wire-dot type, shuttle type, and ink-jet type printers, thermal printing devices are being developed as one of the more promising type. For example, this thermal printing device employs an ink film which is a polyester film having a thickness of 5 to 6 μm coated with a kind of ink which melts due to heat on one surface thereof. The ink film is placed onto a recording sheet with the ink side making contact with the recording sheet, and a thermal printing head makes contact with a rear side of the ink film. When a current flows through the thermal printing head so as to generate heat at the printing head, the ink on the ink film melts at the position corresponding to the position of the printing head, and the melted ink is transferred onto the recording sheet. This thermal printing head comprises a plurality of head elements arranged in a row, and a current is successively applied to each of these head elements.

The density which determines the tone of the printed characters, diagrams, pictures, and the like, is determined by the area of each dot formed on the recording sheet due to the transfer of the melted ink onto the recording sheet. And, this area of the melted ink dot is determined according to the current applied to each of the head elements. Generally, the heat value becomes larger as the magnitude of the currents applied to the head elements become larger. As a result, the area of the melted ink dot becomes larger to increase the printing density, and the tone reaches near a saturated density. Accordingly, the magnitude of currents applied to the head elements were conventionally controlled in order to control the tone of printing. However, the currents applied to the head elements are generally large currents in the range of 5 to 20 Amperes. Thus, it was difficult to control such large currents with a quick response speed, and there was a disadvantage in that the size and cost of the control device became high. In addition, it was impossible to increase the response speed when controlling such large currents, and there was a disadvantage in that the printing speed could not be increased.

SUMMARY OF THE INVENTION

Accordingly, it is a general object of the present invention to provide a novel and useful tone control device for a thermal printing apparatus, in which the above described disadvantages have been overcome.

Another and more specific object of the present invention is to provide a tone control device for a thermal printing apparatus, in which the control of currents applied to the thermal printing head is carried out by controlling the number of pulses having a predetermined current value which are applied to the thermal printing head, in order to control the tone of printing.

Still another object of the present invention is to provide a tone control device for a thermal printing apparatus, which is capable of continuously heating the head elements even during data transfer to a shift register which stores the currents to be applied to each of the head elements, and carry out printing by controlling the tone of printing within a short period of time.

Other objects and further features of the present invention will be apparent from the following detailed description when read in conduction with the accompanying drawings.

BRIEF DESCRIPTION OF THE DRAWINGS

FIGS. 5(A) through 5(D) respectively are graphs for explaining the operation of the block system shown in FIG. 4.

DETAILED DESCRIPTION

Figure 1:
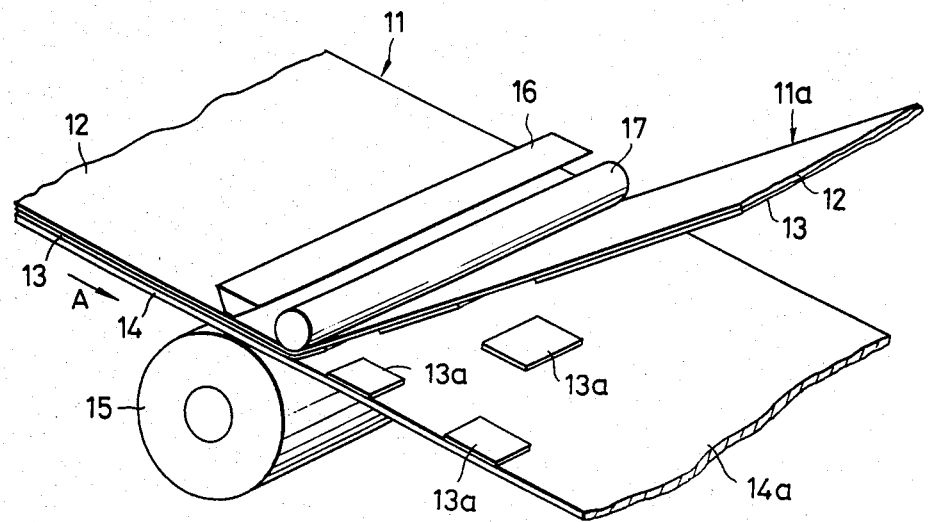
FIG. 1 is a general perspective view showing an example of an essential part of a thermal printing apparatus to which a tone control device according to the present invention may be applied.

FIG. 1 generally shows an example of an essential part of a thermal printing apparatus. An ink film 11 acting as a transfer sheet, comprises a polyester film 12 and a ink 13 of a kind which melts due to heat coated over one surface of the polyester film 12 with a predetermined thickness. A recording sheet 14 makes contact with the side of the ink film 11 coated with the ink 13, and is fed along the direction of an arrow A by a roller 15 together with the ink film 11. A thermal printing head 16 is provided opposing the roller 15, and makes contact with the rear side of the ink film 11, that is, the side of the ink film 11 not coated with the ink 13.

The thermal printing head 16 extends along the width of the ink film 11, and for example, n (n is an integer) thin-film heating resistors are formed in parallel with a width 105 μm as head elements on a ceramic substrate. The number of head elements is determined by the number of dots on one line of the figure, character, and the like to be printed. For example, if 1728 dots are to be printed on one line, 1728 head elements are provided.

Parts of the ink 13 on the ink film 11 corresponding to positions of the head elements which are applied with a current among the head elements constituting the thermal printing head 16, melt and are transferred onto the recording sheet 14. After the ink film 11 passes through the thermal printing head 16, the ink film 11 is guided by a roller 17, separated from the recording sheet 14 and then taken up by a take-up spool (not shown) as a used ink film 11a. The transferred ink 13a remains on a printed surface 14a of the printed recording sheet 14. The area of the transferred ink 13a is shown as a large area in FIG. 1 for conveniences' sake, however, the transferred ink 13a actually is a group of small dots.

One dot is formed by one head element, and the size of that one dot is determined by the magnitude of the current applied to that one head element or the duration with which the current is applied to that one head element. Moreover, the density of the printed figures and the like, that is, the tone of printing is determined by the size of each of the dots. Conventionally, the magnitude of currents applied to the head elements was controlled in order to control this tone of printing. Hence, in the conventional thermal printing apparatus, there were the disadvantages described before. Accordingly, in the present invention, the control of the tone of printing was realized by noting that the size of the dots were also determined by the duration with which the currents having a predetermined value are applied to the head elements. That is, as indicated by a solid line I in FIG. 3(A), the temperature of the head elements become higher as the duration with which the currents having the predetermined value are applied to the head elements becomes longer, and the diameter of one dot becomes larger to increase the density of groups of a plurality of dots. Accordingly, in the present invention, the duration with which the currents are applied to the head elements are controlled as will be described hereinafter, by controlling the number of current pulses having the predetermined current value and predetermined time width which are applied to the head elements, to carry out the control of the tone of printing.

Figure 2:
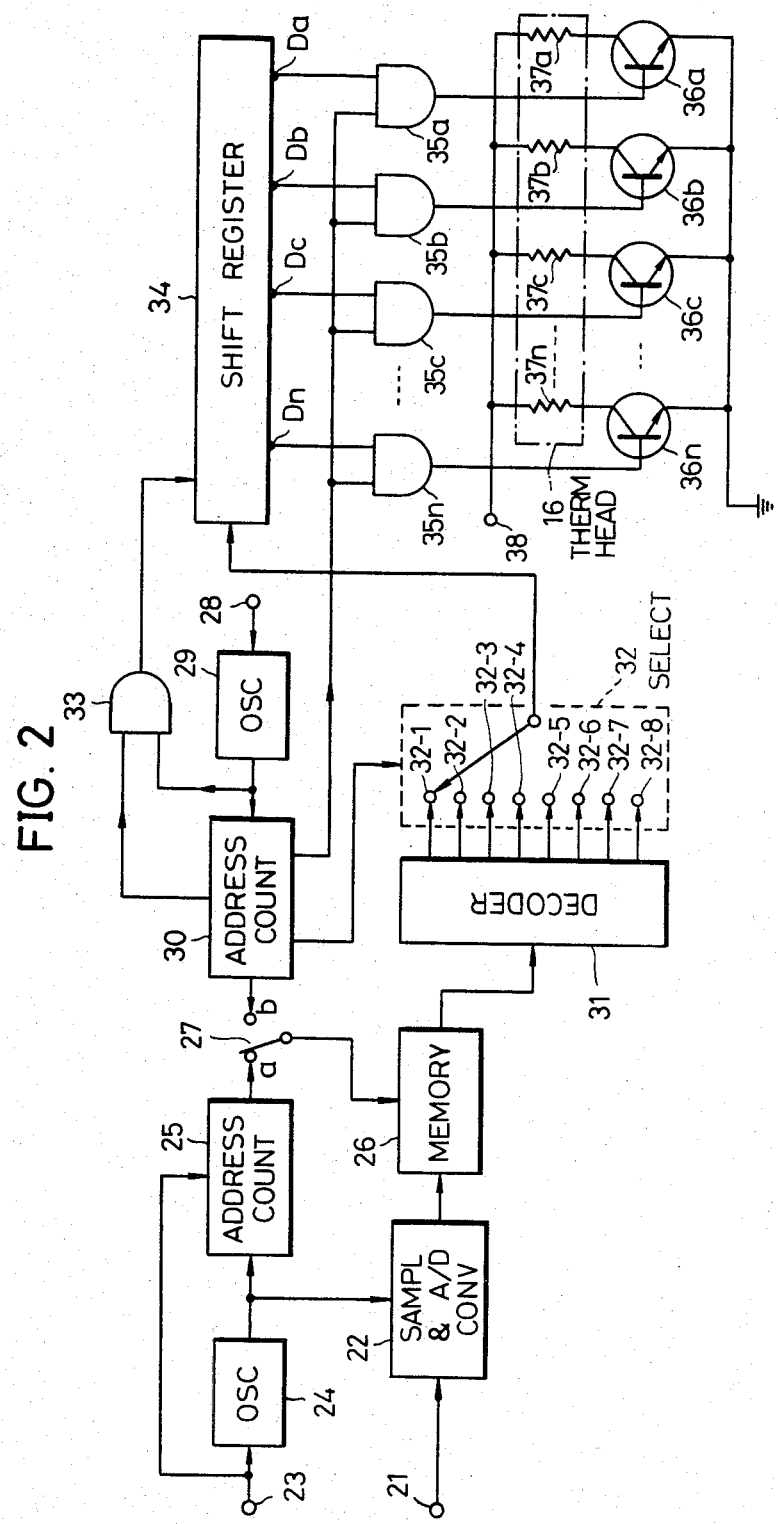
FIG. 2 is a systematic block diagram showing a first embodiment of a tone control device according to the present invention.

FIG. 2 shows a systematic block diagram of a first embodiment of a tone control device according to the present invention. An analog signal of a picture and the like which is to be printed, is supplied to a sampling and analog-to-digital (A/D) converting circuit 22 through an input terminal 21. On the other hand, a synchronizing signal which is synchronized to one line (horizontal scanning line) of the above analog signal, is applied to an oscillator 24 through a terminal 23. The synchronizing signal applied to the oscillator 24 controls the oscillation operation of the oscillator 24, and is also supplied to an address counter 25 to reset the address counter 25. Output clock pulses of the oscillator 24 are supplied to the sampling and A/D converting circuit 22, and n (n is an integer equal to the number of head elements in the thermal printing head) samples of the analog signal supplied to the circuit 22 for each line. The circuit 22 converts the sampled signal into a 3-bit digital signal indicating values from "1" to "8", for example, and supplies the 3-bit digital signal to a memory 26.

The address counter 25 counts the clock pulses from the oscillator 24, and produces an address signal designating addresses "1" through "n" for each line. The address signal produced from the address counter 25 is applied to the memory 26, through a switch 27 which is connected to a contact a during a write-in mode. Hence, the memory 26 writes in the digital signal into the addresses "1" through "n" for each line, and carries out this write-in operation for one picture frame, for example.

Upon starting of the printing, a start signal is applied to a terminal 28, and an oscillator 29 starts to oscillate. An output clock signal of the oscillator 29 is supplied to an address counter 30. When starting the printing, the switch 27 is connected to a contact b, and an output address signal of the address counter 30 is applied to the memory 26 to read out the signals stored at the addresses "1" through "n" of the memory 26. A read-out digital signal is supplied to a decoder 31. The decoder 31 comprises eight output terminals, for example, and produces data values "1" or "0" at contacts 32-1 through 32-8 of a selector 32 according to the value of the digital signal supplied thereto. For example, if the output signal of the memory 26 is a signal indicating the value "5", the decoder 31 produces the data value "1" at the contacts 32-1 through 32-5 and the data value "0" at the contacts 32-6 through 32-8. Thus, the output signal of the memory 26 is a signal indicating a value from among the values "1" through "8", and the data value "1" is produced at the contacts 32-1 through the contact of the selector 32 having the suffix number identical to the output signal value of the memory 26 while the data value "0" is produced at the other remaining contacts.

Figure 3:
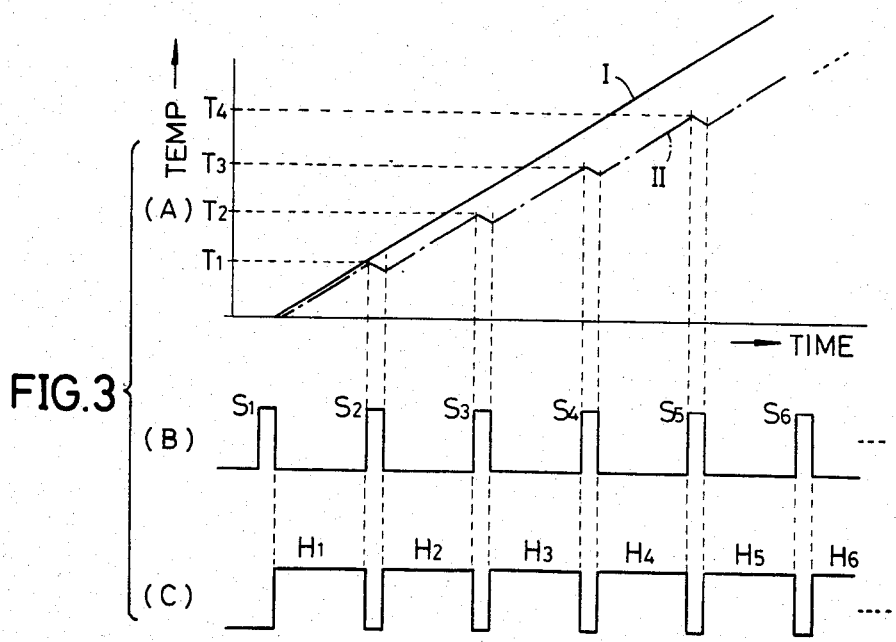
FIGS. 3(A) through 3(C) respectively are graphs for explaining the operation of the block system shown in FIG. 2.

The selector 32 is operates so that a moving contact thereof is successively switched over to connect with a succeeding contact by switching over by one contact from the contact 32-1, every time selector pulses S1, S2, ... shown in FIG. 3(B) is applied to the selector 32 from the address counter 30. When the first selector pulse S1 is applied to the selector 32, the moving contact of the selector 32 is connected to thee first contact 32-1, and the signals indicating the data value "1" or "0" with respect to the addresses "1" through "n" are successively supplied to an n-stage shift register 34 as a data signal from the contact 32-1.

The output clock signal of the oscillator 29 is supplied to an AND-gate 33, and is gated according to a signal also supplied to this AND-gate 33 from the address counter 30 for a duration similar to that of the selector pulses. An output of the AND-gate 33 is applied to the shift register 34 as a clock pulse for data transfer. The shift register 34 stores the data signal obtained from the contact 32-1. Outputs obtained through n output terminals $D_a$ through $D_n$ of the shift register 34, are supplied to one input terminal of respective AND-gates 35a through 35n.

After the storing by the shift register 34, heating pulses shown in FIG. 3(C) are applied to the other input terminal of the respective AND-gates 35a through 35n from the address counter 30. Accordingly, the signals of the addresses "1" through "n" stored into the shift register 34 for the duration of the pulse signal S1, pass through the AND-gates 35a through 35n during the interval in which the heating pulse H1 is applied to these AND-gates 35a through 35n, and are applied to respective bases of transistors 36a through 36n which are connected in parallel with emitters thereof respectively grounded. The transistors 36a through 36n are respectively turned ON when the output signals of the respective terminals $D_a$ through $D_n$ assume the level "1", and remain OFF when the output signals of the terminals $D_a$ through $D_n$ assume the level "0".

Heating resistors 37a through 37n which are provided as head elements of the thermal printing head 16, are connected between a power source terminal 38 and collectors of the transistors 36a through 36n. Among the resistors 37a through 37n, those resistors which are connected to the transistors among the transistors 36a through 36n which become ON, are applied with a current having a predetermined value for the duration of the heating pulse H1 and generate heat.

Next, the second selector pulse signal S2 is applied to the selector 32 from the address counter 30, and the moving contact of the selector 32 is switched over and connected to the contact 32-2. During the duration of the pulse signal S2, the signals of the level "1" or "0" with respect to the addresses "1"through "n" are successively supplied to the shift register 34 and stored therein as data signals.

After the storing is completed in the shift register 34 for the duration of the pulse signal S2, the second heat pulse H2 is applied to the AND-gates 35a through 35n. Hence, for the duration of the heat pulse H2, the outputs "1" or "0" at the terminals $D_a$ through $D_n$ of the shift register 34 are applied to the bases of the respective transistors 36a through 36n, to turn the transistors 36a through 36n ON or OFF according to these outputs at the terminals $D_a$ through $D_n$. Those resistors among the resistors 37a through 37n which are connected to the transistors among the transistors 36a through 36n which are turned ON, are respectively applied with the current and generate heat for the duration of the heat pulse H2.

Similarly, every time the pulses S3, S4, . . . , and S8 are applied to the selector 32, the moving contact of the selector 32 is switched over and connected to the contacts 32-3, 32-4, . . . , and 32-8, and the data obtained at these contacts are respectively stored into the shift register 34. The data stored into the shift register 34 are applied to the bases of the transistors 36a through 36n every time the heat pulses H3, H4, . . . , and H8 are applied to the AND-gates 35a through 35n, to generate heat at the resistors among the resistors 37a through 37n which are connected to the transistors among the transistors 36a through 36n which are turned ON.

The temperature to which one resistor is heated is indicated by a one-dot chain line in FIG. 3(A), where a temperature T1 is obtained by applying the current to the resistor once, a temperature T2 is obtained by applying the current twice, a temperature T3 is obtained by applying the current three times, and so on. Accordingly, in the present embodiment of the invention, the currents are applied to each of the resistors for a number of times between "0" and "8" according to the data. The size of the dot formed by the ink 13 which is melted by each of the heated resistors and transferred onto the recording sheet 14, is determined by the heat vaue of the resistors. Thus, the size of the dot is larger as the heat value of the resistors become larger. Therefore, if the number of times the currents are to be applied to each of the resistors is determined, the density of the figure formed by the dots of ink transferred onto the recording sheet 14 becomes determined, and the control of the tone of printing may be carried out.

For the duration of the pulse signals S1, S2, . . . when the storing is carried out at the shift register 34, the currents are not applied to the resistors and the resistors accordingly do not generate heat. Hence, as indicated by a one-dot chain line II in FIG. 3(A), the temperature of the resistors slightly drop. However, in reality, the duration of each of the heat pulses H1, H2, . . . is 100 microseconds while the duration of the pulse signals S1, S2, . . . in which the currents are not applied to the resistors is an exceedingly short period of time in the order of 100 nanoseconds, and for this reason, no problems are introduced from the practical point of view.

By the operations described heretofore, the heating of the resistors for one line of the picture is completed, and the ink film 11 and the recording sheet 14 are fed by one line to carry out operations identical to those carried out with respect to the first line for the succeeding line. These operations are repeatedly carried out for each of the succeeding lines, to print one picture.

In the embodiment described heretofore, a single address counter may be provided instead of the address counters 25 and 30 to commonly carry out the write-in and read-out with respect to the memory 26 by this single address counter. In this case, the outputs of the oscillators 24 and 29 are switched over and supplied to the single address counter for carrying out the write-in and read-out with respect to the memory 26.

In addition, according to the embodiment described above, the decoder 31 comprises eight output terminals, and the selector 32 comprises eight contacts 32-1 through 32-8. Moreover, the maximum number of times the currents may be applied to the resistors 37a through 37n for one line is set to eight, so as to control the tone of concentration in eight steps. However, the design is not limited to this embodiment, and the number of output terminals of the decoder 31 and the number of contacts of the selector 32 may be determined according to the number steps with which the tone of concentration is to be controlled.

As described heretofore, according to the tone control device of the present invention, the size of the dots which determines the density of the figure and the like which is to be printed, is determined by the number of pulse currents having the predetermined value and predetermined width which are applied to each of the resistors. Thus, almost all the circuit parts constituting the block system shown in FIG. 2 for carrying out the tone control are digital circuits, and the circuit construction of the device of the present invention is simple and may be manufactured at low cost. Further, the maximum operating time of the device for obtaining the saturated density is described by $(t_s+t_h)\times 8$, where $t_s$ indicates the pulse width duration of the pulse signals S1, S2, . . . and $t_h$ indicates the pulse width duration of the heating pulses H1, H2, . . . . Therefore, according to the present invention, one line can be printed within a short period of time while carrying out the control of the tone of printing, because the control of the current values which has a slow response speed is not carried out as in the conventional device.

Even when the relationship between the duration in which the currents are applied to the resistors and the temperature due to the heating is not linear as indicated by the solid line I in FIG. 3(A), the device according to the present invention may also be applied in this case since the temperature due to the heating is determined according to the number of times the pulse currents are applied to the resistors.

Figure 4:
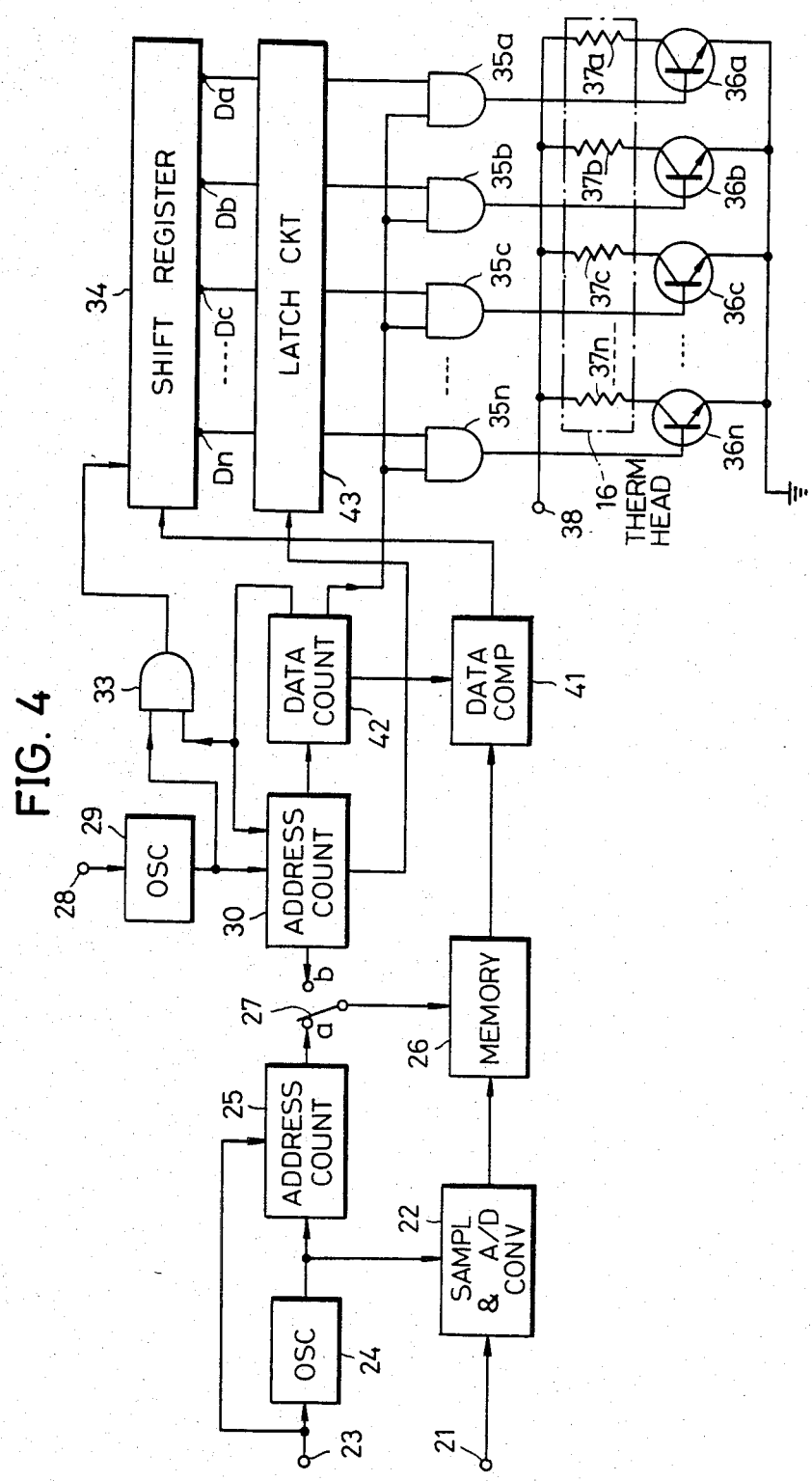
FIG. 4 is a systematic block diagram showing a second embodiment of a tone control device according to the present invention.

A second embodiment of a tone control device according to the present invention will now be described in conjunction with FIG. 4. In FIG. 4, those parts which are the same as those corresponding parts in FIG. 2 are designated by the same reference numerals, and their description will be omitted.

The write-in operation with respect to the memory 26 is the same as in the first embodiment of the invention. During the read-out from the memory 26, the switch 27 is connected to the contact b, and the data at the addresses "1" through "n" of the memory 26 are repeatedly read out eight times, for example, for each line. The read out data from the memory 26 are supplied to a data comparator 41.

The output of the address counter 30 is supplied to a data counter 42, and the counted value of the data counter 42 is incremented by "1" for every one scan of the addresses "1" through "n" with respect to one line. In the present embodiment, the data counter 42 increments the value from "1", and supplies the counted value "2", "3", . . . , and "8" to the data comparator 41. Initially, the value "1" is supplied to the data comparator 41 from the data counter 42, and the data comparator 41 compares the value "1" with each of the values at the addresses "1" through "n" of the memory 26. If the values from the memory 26 are equal to or larger than "1", the data comparator 41 produces an output "1", and produces an output "0" if the values from the memory 26 are "0". The output of the data comparator 41 is successively supplied to the shift register 34. The output clock pulses of the oscillator 29 are gated by the AND-gate 33 according to the output of the data counter 42, and the output of the AND-gate 33 is supplied to the shift register 34 as the pulse for data transfer. Accordingly, the output data of the data comparator 41 is stored into the shift register 34 for the duration of the pulse S1 shown in FIG. 5(B). the address counter 30 is reset by the output of the data counter 42 when the address counter 33 produces the address signal of the address "n", and again starts to produce the address signals from the address "1".

When the storing by the shift register 34 is completed, a latch signal L1 shown in FIG. 5(C) is applied to a latch circuit 43 from the address counter 30. Hence, the latch circuit 43 latches the output data produced through the output terminals $D_a$ through $D_n$ of the shift register 34. The latched data are applied to one input terminal of the respective AND-gates 35a through 35n. As the above latching is carried out by the latch circuit 43, a heating signal H1 shown in FIG. 5(D) is applied to the other input terminal of the respective AND-gate 35a though 35n from the data counter 24. Thus, among the transistors 36a through 36n, those transistors which are supplied with the latched data are turned ON, and the resistors respectively connected to these ON transistors are applied with the currents.

While the resistors become heated according to the heating signal H1, the counted value of the data counter 42 is incremented by "1", and the data counter 42 supplies a signal corresponding to the value "2" to the data comparator 41. The data comparator 41 compares the values of data read out from the addresses "1" through "n" for the second time with the value "2" obtained from the data counter 42. The data comparator 41 produces a signal "1" if each of the data at the addresses "1" through "n" are equal to or larger than "2", and produces a signal "0" if each of the data are equal to or smaller than "1". The output data of the data comparator 41 is stored into the shift register 34 for the duration of the signal S2. During this storing of data into the shift register 34, the resistors connected to the respective transistors which are supplied with the data previously latched by the latch circuit 43 become heated. For this reason, as in the first embodiment described before, the heating of the resistors is uninterrupted during the storing of data into the shift register 34.

The data stored into the shift register 34 are latched by the latch circuit 43 according to a latch signal L2. Moreover, among the resistors 37a through 37n, those resistors connected to respective transistors which are turned ON by being supplied with the latch data, are applied with currents according to a heating signal H2 following the heating signal H1. As described above, the application of currents to the resistors is uninterrupted during the storing of data into the shift register 34. Thus, those resistors which were previously applied with currents and are to be applied with the currents also during this interval, are continuously applied with the currents without interruption.

Next, the counted value of the data counter 42 is again incremented by "1", and supplies a signal corresponding to the value "3" to the data comparator 41. The data comparator 41 produces a signal "1" if each of the data at the addresses "1" through "n" are equal to or larger than "3", and produces a signal "0" if each of the data are equal to or smaller than "2". The operations succeeding thereafter such as storing of data into the shift register 34, latching of the outputs of the shift register 34 by the latch circuit 43, application of currents to the resistors according to the data by a heating signal H3, and the like, are the same as those described before. Thereafter, similar operations are carried out every time the counted value of the data counter 42 is incremented by "1", and in the present embodiment, such operations are continued until the value of the output signal of the data counter 42 becomes equal to "8". Operations similar to those described above are repeatedly carried out with respect to the succeeding lines.

According to the device of the present embodiment, the data ounter 42 and the data comparator 41 which are mass-produced and commercially available, are used instead of the decoder 31 and the selector 32 used in the first embodiment of the invention. Thus, the circuit construction of the device is more simple, and the device may be manufactured at low cost. For example, as integrated circuit (IC) chip SN 7485 manufactured by Texas Instruments, an IC comprising a read-only-memory (ROM), and the like, may be used for the data comparator 41. In addition, because the latch circuit 43 is used, the application of currents to the resistors with respect to the previously latched data is continued during the storing of data into the shift register 34. Thus, there is no unused time between the heating pulses H1, H2, . . . shown in FIG. 3(C) when the heating of the resistors is not carried out, and the printing time can be further reduced. When the application of currents to the resistors is continued, a temperature characteristic indicated by a one-dot chain line III in FIG. 5(A) can be obtained with respect to the temperatures of the heated resistors, which is substantially the same as the characteristic indicated by the solid line I. The heating signals H1, H2, . . . shown in FIG. 5(D) are actually continuous.

Futher, the present invention is not limited to these embodiments, but various variations and modifications may be made without departing from the scope of the present invention.

What is claimed is:

1. A tone control device in a thermal ink-transfer type printing apparatus comprising a thermal printing head having a plurality of head elements arranged in line, said plurality of head elements respectively comprising heating resistors for heating a transfer sheet adhered with a kind of ink which melts due to heat and transferring melted ink onto a recording sheet which makes contact with said transfer sheet to print images such as characters and figures, said tone control device comprising:

converting means for sampling an input analog signal indicating tone of density of an image to be printed on said recording sheet for one line according to the number n of said head elements, and converting said input analog signal into corresponding n digital data of natural binary code;

memory means for storing the output converted digital data of said converting means as they are;

second converting means repeatedly reading out the n digital data corresponding to said n head elements from the memory means k times for one line, where k is an integer greater than one, for producing control data in a form of a serial n-bit data signal every time said n digital data are read out once, each data value of the n-bit data signal being "1" or "0" depending on whether each value of the n digital data is equal to or larger than a preset value, respectively, the preset value being incremented one by one every time the n digital data are read out once;

serial-parallel converting means for converting said serial n-bit data signal of the control data into parallel n-bit data signal; and driving means receiving the parallel n-bit data signal of the control signal for supplying currents having a predetermined current value for a predetermined time duration to the head elements which correspond to the control data having the value of "1", the driving means supplying the currents every time the n digital data are read out and converted into the parallel n-bit data.

2. A tone control device as claimed in claim 1 in which said serial-parallel converting means comprises an n-stage shift register for storing said control data, the driving means including heating pulse generating means for generating heating pulses having a predetermined repetitive rate and each having a time duration equal to said predetermined time duration, n control elements respectively connected to respective heating resistors of said head elements, for controlling application of currents to said heating resistors, and applying means for applying outputs of said shift register to said control elements, respectively, for the time durations in which said heating pulses are applied thereto.

3. A tone control device as claimed in claim 2 in which each of said control elements comprises a transistor connected in series with respect to each of said heating resistors and mutually in parallel with respect to a power source, and said applying means comprises n AND-gates respectively applied with outputs of said shift register from each stage and commonly applied with said heating pulses.

4. A tone control device as claimed in claim 2 in which said heating pulse generating means does not generate said heating pulses during storing of control data into said shift register, and generates said heating pulses each having the predetermined time duration after completion of storing of control data into said shift register.

5. A tone control device as claimed in claim 2 in which said driving means further comprises latch circuit means for latching outputs from respective stages of said shift register upon completion of storing of control data into said shift register every time storing of control data into said shift register is completed, said heating pulse generating means generates said heating pulses during storing of control data into said shift register and after completion of storing of control data into said shift register so as to substantially continuously generate k heating pulses each having the predetermined time duration, and said applying means applies outputs of said shift register which are latched by said latch circuit means to said control elements respectively for the time durations in which said heating pulses are applied thereto.

6. A tone control device as claimed in claim 2 in which said second converting means comprises a decoder for producing outputs through k stages of output terminals according to values of digital data read out from said memory means, and a selector for switching the produced outputs through each of said output terminals of said decoder by one output terminal so as to supply the outputs to said shift register every time the n digital data are read out from said memory means.

7. A tone control device as claimed in claim 2 in which said second converting means comprises counter means for incrementing by "1" every time the n digital data are read out from said memory means up to k times, and a data comparator for comparing values of n data read out from said memory means and each of incremented values in said counter means, and supplying outputs to said shift register.

* * * * *